(12) United States Patent
Sugaya et al.

(10) Patent No.: US 7,164,695 B2
(45) Date of Patent: Jan. 16, 2007

(54) WIRELESS TRANSMISSION APPARATUS AND WIRELESS TRANSMISSION METHOD

(75) Inventors: Shigeru Sugaya, Kanagawa (JP); Yasunori Maeshima, Tokyo (JP); Hidemasa Yoshida, Chiba (JP)

(73) Assignee: Sony Corporation (JP)

( * ) Notice: Subject to any disclaimer, the term of this patent is extended or adjusted under 35 U.S.C. 154(b) by 1001 days.

(21) Appl. No.: 10/085,451

(22) Filed: Feb. 28, 2002

(65) Prior Publication Data

US 2002/0146037 A1 Oct. 10, 2002

(30) Foreign Application Priority Data

Mar. 2, 2001 (JP) ............... P2001-058616

(51) Int. Cl.
*H04J 3/24* (2006.01)
*H04L 12/50* (2006.01)
*H04Q 11/00* (2006.01)
*H04B 7/212* (2006.01)

(52) U.S. Cl. ............... 370/474; 370/348; 370/389

(58) Field of Classification Search ........ 370/471–480, 370/236, 237, 386, 230, 235, 412, 349, 314, 370/348, 474, 337, 389–394, 252; 455/436, 455/456; 714/776, 4, 749, 758; 709/225, 709/228, 226, 250, 235, 217, 229

See application file for complete search history.

(56) References Cited

U.S. PATENT DOCUMENTS 5,862,142 A * 1/1999 Takiyasu et al. ............ 370/480
6,243,846 B1 * 6/2001 Schuster et al. ............ 714/776
6,532,364 B1 * 3/2003 Uchida et al. .............. 455/436
6,747,972 B1 * 6/2004 Lenoski et al. ............. 370/236
6,925,060 B1 * 8/2005 Mangin ..................... 370/237
6,967,926 B1 * 11/2005 Williams et al. ............ 370/236
6,996,100 B1 * 2/2006 Haartsen .................... 370/389
2001/0014087 A1 * 8/2001 Sugaya et al. .............. 370/337
2002/0039904 A1 * 4/2002 Anderson ................... 455/456
2002/0159432 A1 * 10/2002 Sugaya ....................... 370/349
2003/0210710 A1 * 11/2003 Odman ....................... 370/471
2004/0170135 A1 * 9/2004 Sugaya ....................... 370/314
2005/0276255 A1 * 12/2005 Aiello et al. ................ 370/348

* cited by examiner

*Primary Examiner*—Chi Pham
*Assistant Examiner*—Prenell Jones
(74) *Attorney, Agent, or Firm*—Lerner, David, Littenberg, Krumholz & Mentlik, LLP (57) ABSTRACT

A wireless transmission apparatus and a wireless transmission method capable of performing simple transmission control, in which an information transmission flow control method, instead of reporting vacant-buffer information from a receiving destination apparatus, an information transmission-source apparatus permits the transmission of a packet up to a predetermined transmission window size from the packet for which acknowledgement has not been received from an information receiving destination, and the transmission of a packet exceeding that transmission window size is inhibited. As a result, if the packet is within that transmission window size, even if the information receiving destination has not confirmed the reception of the acknowledgement (ACK) information, the packet is transmitted unconditionally. Furthermore, a transmission pointer and an ACK receiving pointer are provided, and even if acknowledgement is not received, control is performed using the transmission window size in which transmission is possible.

8 Claims, 9 Drawing Sheets

WIRELESS TRANSMISSION APPARATUS AND WIRELESS TRANSMISSION METHOD

BACKGROUND OF THE INVENTION

1. Field of the Invention

The present invention relates to a wireless transmission apparatus and a wireless transmission method for transmitting various types of information using, for example, a wireless signal, among a plurality of communication terminals.

2. Description of the Related Art

As a conventional asynchronous wireless transmission method, a wireless transmission method in which information transmitted from a high-order layer is buffered and this information is transmitted when an access control right can be acquired within a predetermined time has been generally used.

Furthermore, in the conventional asynchronous wireless transmission method, since information transmitted from a high-order layer need only be transmitted wirelessly in a short time, when a request for transmitting new information is received continuously from the high-order layer, a control method in which the new information is discarded has been generally used.

That is, if acknowledgement (ACK) information is not returned from the information receiving destination, a control method in which an error display is instantly made and the fact that transmission is impossible is returned to the high-order layer has been used. Furthermore, when an error occurs, a control method in which operation such as retransmission is performed according to the determination by the high-order layer has been conceived.

As a conventional flow control method using a sequence window, a window control method in which information concerning the size of a buffer area present in the receiving destination is first reported to the information transmission destination, and the information transmission source refrains from transmitting information exceeding this size has been used.

Furthermore, in a case where certain information is to be transmitted wirelessly, a method in which that information is divided into packets with a predetermined fragment size and the packets are transmitted has been generally used. This method of transmitting packets is widely used in wireless transmission lines.

In addition, recently, a method has been conceived in which, at the information transmission source, the information to be transmitted is divided into packets of a predetermined size, these packets are transmitted wirelessly, these packets are collected, and then the original information is restored in the information receiving destination.

This method has been considered for use in combination with a selection-repeat-resend (SR)-type automatic resend request (ARG) method, in which information on packets which were successfully received by the information receiving destination is transmitted as acknowledgement information to the information transmission source and in which only the packet which has not been received is selected and retransmitted from the information transmission source.

When the conventional selection-repeat-resend-type automatic resend request method is used, by returning the acknowledgement information collectively to a certain degree, retransmission control in packet units can be easily performed. Therefore, by decreasing the number of packets indicating the amount of information flowing through a wireless transmission line, the information traffic during retransmission can be decreased.

As a result, information traffic during retransmission can be reduced as a retransmission control method of packet transmission, and transmission suitable for a wireless transmission line having a high transmission error rate can be performed.

Such a conventional wireless transmission method is designed on the premise that, after information is transmitted, the reception is acknowledged immediately by the information receiving destination. Therefore, there is a problem in that, when asynchronous information having different destinations is transmitted wirelessly in a case where a plurality of devices is connected to a wireless transmission apparatus, each transmission must be handled by a different process.

In a conventional transmission sequence, there is a problem in that the transmission of the next asynchronous information cannot be performed until the transmission of one piece of asynchronous information which is received from the high-order layer is completed. As a result, in the transmission apparatus of the information transmission source, there is the problem of having to provide a redundant buffer area for storing data which cannot be sent to make that information effective in order to be able to deal with a case in which an asynchronous information request occurs continuously from the high-order layer.

Furthermore, in the method for performing wireless transmission to a plurality of destinations by using a conventional method, regarding the setting of various types of parameters, such as the management of a sequence number for performing retransmission control, there is also the problem of having to perform the setting individually according to the number of destinations.

Furthermore, the conventional transmission flow control method using a window is a control method which is mainly suitable for wired transmission lines in which a two-way link is reliably established and is suitable for line-switched-type information transmission lines, and there is a problem in that it is difficult to use the method for wireless transmission lines in which instability of the two-way link is permitted and for packet-switched-type wireless transmission lines. This problem occurs because no method for reliably transmitting the size of the buffer area present in the receiving destination device to a device which is an information transmission source has been provided.

Furthermore, in a case where the conventional selection-repeat-resend-type automatic resend request method is used, there is a problem in that, since the information transmission source determines whether the packet is information which is not received on the basis of the acknowledgement (ACK) information returned from the information receiving destination, a memory space corresponding to a bit map of a series of sequence numbers is required to identify which sequence number corresponds to a packet which has been transmitted and for which the acknowledgement (ACK) information has not been received.

In addition, in a case where sequence numbers are managed individually for each destination as in the conventional method, a different parameter for each receiving destination station must be provided according to the number of stations for which connection is assumed, and there is a problem in that a large memory area is required to manage these sequences.

SUMMARY OF THE INVENTION

The present invention has been made in view of such a situation. An object of the present invention is to provide a wireless transmission apparatus and a wireless transmission method which are capable of performing simple transmission control.

The wireless transmission method and the wireless transmission apparatus of the present invention are such that, in a transmission apparatus of an information transmission source, when asynchronous information, received from a high-order layer, for different destinations, are to be transmitted wirelessly, the asynchronous information for different destinations is packetized with a predetermined fragment size and is buffered, so that the asynchronous information for a plurality of destinations can be handled by one process.

Furthermore, the wireless transmission method of the present invention is such that, when a transmission apparatus of an information transmission source acquires a predetermined access control right in a wireless transmission line, the buffered packets are transmitted to the plurality of destinations.

As a result, the information transmitted from the high-order layer is packetized in sequence in predetermined units, an individual sequence number is assigned to the packets, the packets are stored in the transmission buffer, and the packets are transmitted under the control of predetermined access control.

Furthermore, in the wireless transmission method of the present invention, the most recent buffered packet is stored as the value of the buffer pointer, and when an asynchronous transmission request occurs continuously from a high-order layer, continuous information is packetized by referring to this buffer pointer so that the sequence numbers do not overlap.

As a result, in a case where sequence number control is performed, the most recently assigned sequence number is registered as a buffer pointer, and when information is transmitted again from the high-order layer regardless of the fact that the information remains in the transmission buffer, the buffer pointer is read, and a sequence number is assigned for each packet without duplication.

In the wireless transmission method of the present invention, packets up to a value indicated by a total sequence-number space for which acknowledgement information is confirmed from the receiving-destination transmission apparatus minus one is stored in the transmission buffer.

As a result, it is possible to store information up to the number area of the value such that one is subtracted from the value indicated at the position of the ACK received pointer indicating the area in which the transmission has been completely terminated.

Furthermore, in the wireless transmission method of the present invention, the sequence number of the information which was successfully received by the information receiving destination is returned as acknowledgement (ACK) information to the information transmission source, and when information which has not yet been received from the information transmission source is retransmitted, the transmission apparatus of the information transmission source does not immediately retransmit all the information even if the acknowledgement (ACK) information from the information receiving destination is delayed; rather, it awaits the reception of the acknowledgement (ACK) information until a predetermined time has elapsed, and retransmits only the information for which the acknowledgement (ACK) information has not been received.

As a result, in the selection-repeat-resend-type automatic resend request control, when ACK information is returned from the information receiving destination, it is possible to wait for the reception of ACK information until a predetermined time elapses after the information is transmitted from the information transmission source.

Furthermore, in the wireless transmission method of the present invention, as the information transmission flow control method, instead of reporting the vacant-buffer information from the receiving destination apparatus, the information transmission-source apparatus permits the transmission of a packet up to a predetermined window size from the packet for which acknowledgement (ACK) information has not been received from the information receiving destination and inhibits the transmission of the packet exceeding the window size.

As a result, as the information transmission flow control, the window size of a predetermined sequence is provided, and, if the packet is within that window size, the packet can be transmitted unconditionally even if the information receiving destination has not received the ACK information.

In the selection-repeat-resend-type automatic resend request control, transmission information flow control can be used.

Furthermore, in the wireless transmission method of the present invention, as the control method, a transmission pointer and an ACK receiving pointer are provided, and control is performed by using a predetermined window size in which transmission is possible even if ACK is not received.

In addition, in the wireless transmission method and the wireless transmission apparatus of the present invention, a low-order bit-map-space area which is an area two times as large as the predetermined window size, and a high-order-bit identification pointer indicating the position in the total sequence-number space the low-order bit-map-space area corresponds are used, and when the ACK receiving pointer exceeds the first half of the low-order bit-map-space area, the high-order-bit identification pointer is added, and the second half of the low-order bit-map-space area used thus far is reused as a new first half.

With this arrangement, as a method of managing transmission sequences, a low-order bit-map-space area which is an area two times as large as an assumed window size, and a high-order-bit identification pointer indicating the position in the total sequence-number space this area corresponds are provided, and these are reused, making it possible to easily realize sequence control.

According to the wireless transmission apparatus and the wireless transmission method of the present invention, since information which is asynchronously transmitted by the transmission apparatus of the information transmission source is packetized in sequence at a predetermined fragment size and the packets are buffered, it is possible to obtain a wireless transmission apparatus and a wireless transmission method for use in wireless transmission lines in which asynchronous transmission cannot be performed instantly. Furthermore, since asynchronous information for a plurality of different destinations is packetized at a predetermined fragment size, by acquiring an access control right once, it is possible to obtain a wireless transmission method and a wireless transmission apparatus for transmitting a packet to a plurality of destinations. As a result, it is possible to more efficiently realize asynchronous transmission in wireless transmission lines in which it is difficult to acquire an access control right.

According to the wireless transmission method of the present invention, since asynchronous information which is received from a high-order layer is packetized in sequence, it is not necessary to start a sequence number management process individually, and transmission control can be simplified. As a result, the transmission apparatus of the information transmission source needs only to manage only one sequence-number space, and control can be simplified.

According to the wireless transmission method of the present invention, information can be packetized up to a sequence number area in which one is subtracted from the value at the position of the ACK receiving pointer indicating the value of the acknowledgement (ACK) information, and the packets can be stored in the transmission buffer. Therefore, even when the access control right cannot be passed to the transmission apparatus of the information transmission source, the buffering of the asynchronous information which is received from the high-order layer can be continuously performed for a long period of time.

According to the wireless transmission method of the present invention, since only the packet for which acknowledgement (ACK) information has not been received until a predetermined time needs to be retransmitted, it is not necessary to perform wasteful information retransmission, and information traffic in the wireless transmission line can be reduced.

According to the wireless transmission method of the present invention, when there is information which has not been received is present in the acknowledgement (ACK) information from the transmission apparatus of the information receiving destination or when the acknowledgement (ACK) information cannot be received, the transmission apparatus of the information transmission source permits the transmission up to a predetermined window size from the oldest packet for which the acknowledgement (ACK) information has not been received, and controls transmission exceeding the window size. As a result, even if information for window control is not received from the information receiving destination, transmission flow control for limiting the number of packets to be transmitted can be realized. As a result, even if the transmission apparatus of the information transmission source has not detected the state of the transmission apparatus of the information receiving destination, transmission flow control based on the determination of the transmission apparatus of the information transmission source can be realized.

According to the wireless transmission method of the present invention, in a case where this transmission flow control is used for automatic resend request control for retransmitting only the packet for which the acknowledgement (ACK) information has not been received, when the connection with the transmission apparatus of the information receiving destination is not established, the transmission apparatus of the information transmission source can inhibit wasteful information transmission. Furthermore, a transmission pointer and an ACK receiving pointer are provided, and control is performed using a predetermined window size in which transmission is possible even if the acknowledgement (ACK) information is not received, making it possible to efficiently realize selection-repeat-resend-type automatic resend request control.

According to the wireless transmission method and the wireless transmission apparatus of the present invention, as a result of using a low-order bit-map-space area which is two times as large as the transmission window size, and a high-order bit identification pointer for identifying the position thereof, sequence number management in which the whole of the large sequence-number space needs not to be managed can be realized. That is, a packet for which acknowledgement (ACK) information has not been received, which is present within the transmission window size, can be confirmed from within a small number of bit-map spaces. As a result, the management of sequence numbers can be simplified, and sequence management appropriate for selection-repeat-resend-type automatic resend request control can be realized.

According to the wireless transmission method of the present invention, when the ACK receiving pointer exceeds the half of the bit-map space, the second half of the bitmap space is used as the first half, and a new second half is provided, making it possible to repeatedly use the lowest number of bit-map spaces. As a result, a large sequence-number space can be realized using only the least amount of necessary memory space.

DESCRIPTION OF THE PREFERRED EMBODIMENTS

Embodiments of the present invention will be described below.

The wireless transmission method of this embodiment performs transmission flow control so that a predetermined transmission window size is determined in advance in the information transmission source, and if ACK information is not returned from the information receiving destination, the transmission of information exceeding that window size is not performed. Furthermore, this wireless transmission method is also a sequence number management method using a selection-repeat-resend-type automatic resend request method.

Figure 1:
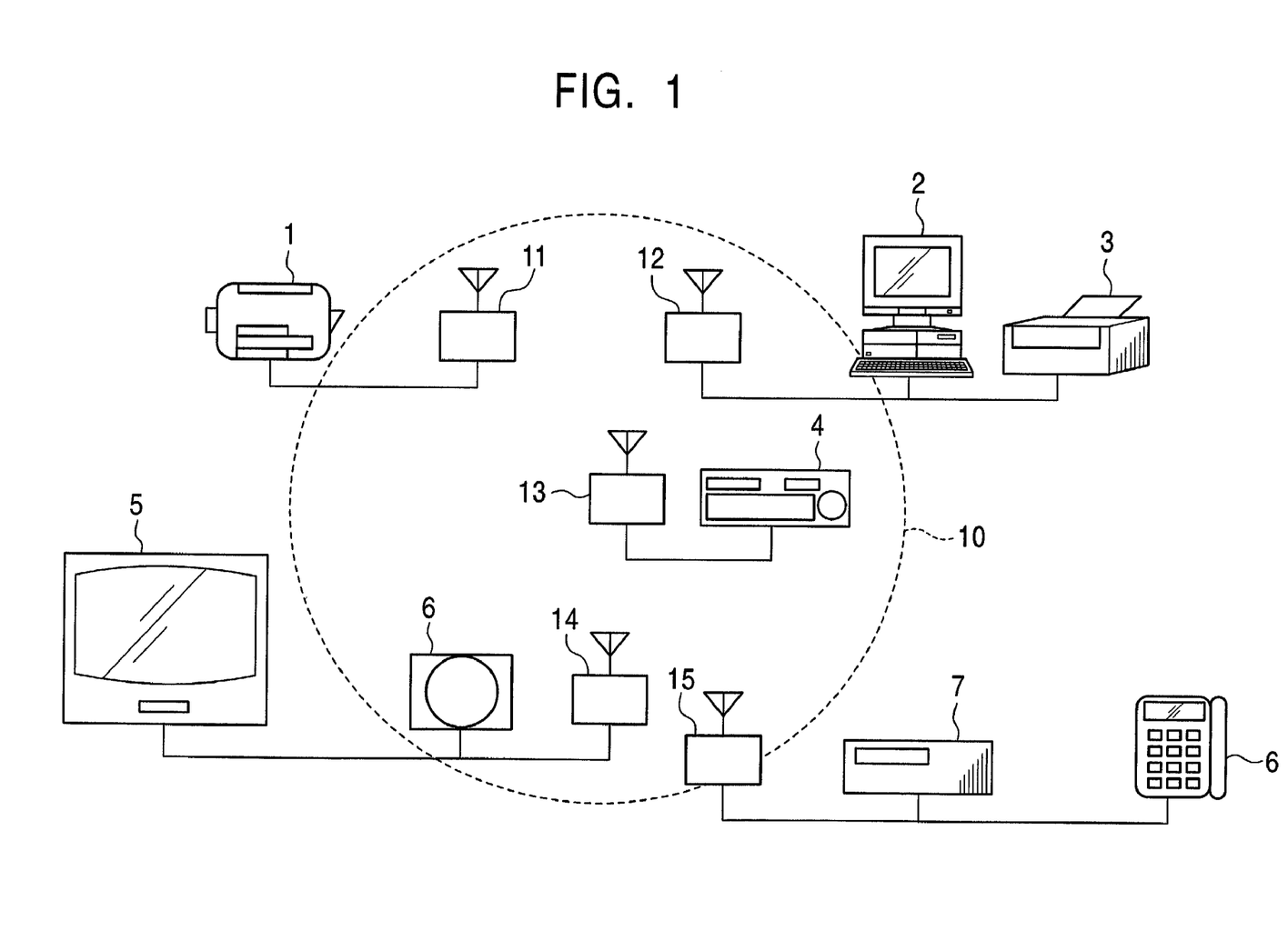
FIG. 1 shows an example of the configuration of a wireless network according to an embodiment of the present invention.

This embodiment will be described below. FIG. 1 shows an example of the configuration of a wireless network in which the wireless transmission method of this embodiment is used.

For example, as shown in FIG. 1, a camera-integrated VTR 1 is connected by wires to a wireless transmission apparatus 11 through a cable, etc. Similarly, a personal computer 2 and a printer output device 3 are connected by wires to a wireless transmission apparatus 12 through a cable, etc. Similarly, a VTR 4 is connected by wires to a wireless transmission apparatus 13 through a cable, etc. Similarly, a television receiver 8 and a game machine 6 are connected by wires to a wireless transmission apparatus 14 through a cable, etc. Similarly, a set top box 7 and a telephone device 8 are connected by wires to a wireless transmission apparatus 15 through a cable, etc.

In this manner, each device is connected to each wireless transmission apparatus, and the wireless transmission apparatuses form a network 10.

Here, the wireless transmission apparatuses 11 to 15 are associated as communication stations #1 to #5, respectively, and a state in which a wireless network is formed is shown.

Since the wireless transmission apparatus 13 exists in the center of the network 10 and can communicate with all the other communication apparatuses, the wireless transmission apparatus 13 becomes a control station of the network 10 for the sake of convenience, defines the frame period, sends a predetermined access control signal, and manages bandwidth reservation information, so that the other wireless transmission apparatuses 11, 12, 14, and 15 become communication stations.

Figure 2:
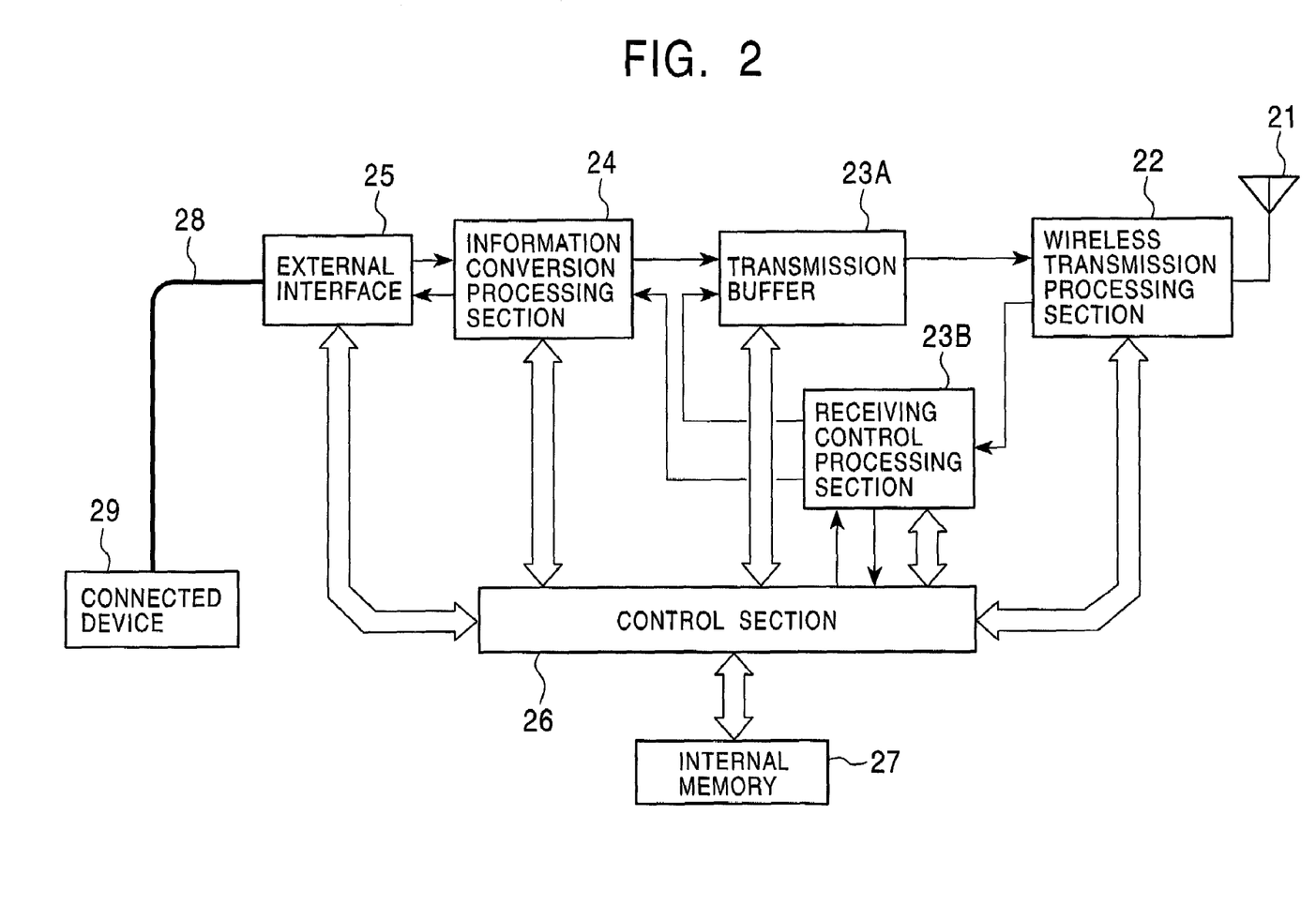
FIG. 2 is a block diagram showing an example of the construction of a wireless transmission apparatus.

FIG. 2 shows an example of the construction of the wireless transmission apparatuses 11 to 15 which form each communication station.

Here, the wireless transmission apparatuses 11 to 15 are basically constructed to be common and comprise an antenna 21 for performing transmission and reception, and a wireless transmission processing section 22 for performing a wireless transmission process and a wireless receiving process, so that wireless transmission with the other transmission apparatuses can be performed.

In this case, for a transmission method in which transmission and reception are performed by the wireless transmission processing section 22 of this embodiment, for example, a transmission method using a multi-carrier signal, called an "OFDM (Orthogonal Frequency Division Multiplex" is used, and for a frequency used for transmission and reception, for example, a very high frequency band (for example, 5 GHz band) is used.

In the case of this example, for the transmission output, a relatively weak output is set, so that, when, for example, used indoors, an output of such a degree that wireless transmission for a relatively short distance from several meters to several tens of meters can be performed is assumed, and the construction may be adjusted as necessary.

The wireless transmission processing section 22 has functions of detecting a specific frequency carrier on wireless transmission lines and detecting a synchronization signal, so that, when this synchronization signal is received, the information portion following the synchronization signal is received.

Furthermore, a receiving control processing section 23B for performing a receiving/decoding process of various types of transmission information on the signal received by the wireless transmission processing section 22, and a transmission buffer 23A for storing information transmitted by the wireless transmission processing section 22 are provided.

Furthermore, an information conversion processing section 24 for converting packet data received by the receiving control processing section 23B into asynchronous information, for performing data conversion into packet data, and for storing the data in the transmission buffer 23A so that the asynchronous information is transmitted by the wireless transmission processing section 22 is provided.

In addition, the data converted by the information conversion processing section 24 is supplied to a connected device 29 via an interface section 25, and the data supplied from the connected device 29 is supplied to the information conversion processing section 24 via the interface section 25, so that a conversion process can be performed.

Here, as an external interface of the interface section 25 of the wireless transmission apparatus, for example, audio and video information, or various types of data information, can be transmitted to and received from the connected device 29 through a high-speed serial bus 28 such as an IEEE 1394 format.

Alternatively, these wireless transmission apparatuses may be incorporated inside the main unit of the connected device 29.

Furthermore, each section inside each wireless transmission apparatus performs a process under the control of a control section 26 formed of a microcomputer, etc.

In addition, an internal memory 27 is connected to the control section 26 so that information on the method for using the wireless network and the wireless transmission line, such as data required for communication control, the number of communication stations forming the network, bandwidth reservation information, etc., is temporarily stored in the internal memory 27.

Figure 3:
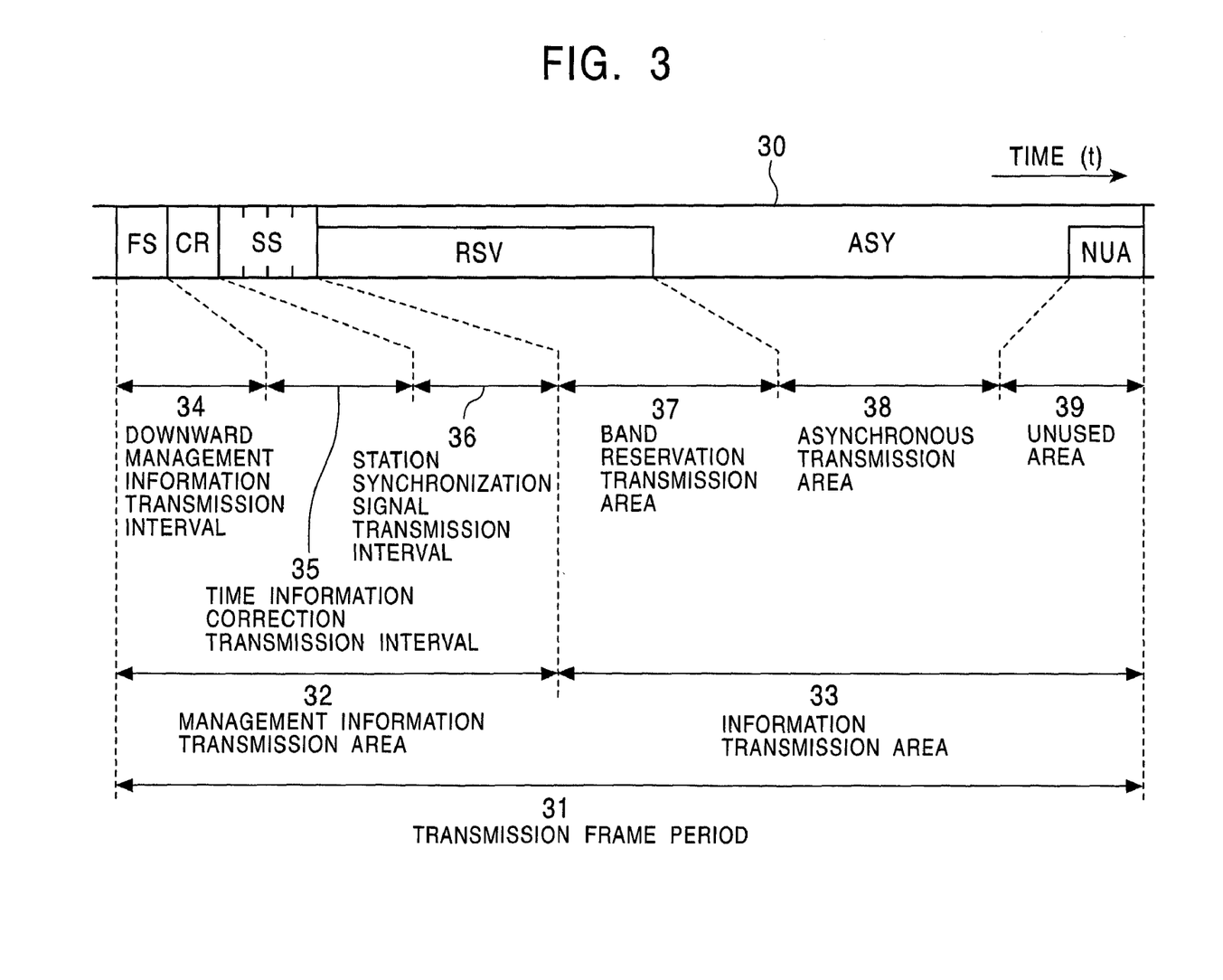
FIG. 3 shows an example of the structure of a wireless transmission frame.

FIG. 3 shows an example of the structure of a wireless transmission frame according to this embodiment. Here, although a frame is defined for the sake of convenience, it is not always necessary to take such a frame structure. FIG. 3 shows that, in a wireless transmission line 30, a transmission frame which arrives for each fixed transmission frame period 31 is defined, and a management information transmission area 32 and an information transmission area 33 are provided therein.

At the start of this frame, a downward management information transmission interval 34 (frame start (FS)) for reporting frame synchronization and network common information is placed, and is followed by a time information correction transmission interval 35 (cycle report (CR)) as necessary, and furthermore, a station synchronization signal transmission/receiving interval 36 (station sync (SS)) is placed.

The downward management information transmission interval (FS) is used to transmit information which must be shared in the network from the control station, and is composed of a fixed-length area and a variable-length area.

In the fixed-length area, in order to specify the length of the variable-length area, the number of communication stations transmitted in the station synchronization signal transmission/receiving interval (SS) is specified, and the number of bandwidth reservation transmission areas (RSV) is specified. In the variable-length area, the communication station transmitted in the station synchronization signal transmission/receiving interval (SS) is specified, and the bandwidth reservation transmission areas (RSV) is specified.

This station synchronization signal transmission/receiving interval (SS) has a predetermined length, and a transmitting communication station is assigned at a certain degree of period to each communication station which is a constituent of the network on the basis of the downward management information.

For example, the connection link state with the communication station which is present around the station of its own can be confirmed by receiving all except for the transmission portion of the station of its own within this station synchronization signal transmission/receiving interval (SS).

Furthermore, by reporting this connection link state into the information transmitted next by the station of its own in the station synchronization signal transmission/receiving interval (SS), it is possible for each communication station to confirm the connection state of the network.

The information transmission area 33 is composed of a bandwidth reservation transmission areas (RSV) 37 which is set as necessary, a asynchronous transmission area (Asynchronous (ASY)) 38 for centralized management where the control station performs transmission control, and a unused area (Not Using Area (NUA)) 39 where the control station does not perform transmission control and use is allowed by another network system.

That is, if the bandwidth reservation transmission area (RSV) and the unused area (NUA) are not necessary, the whole of the information transmission area 33 can be transmitted as the asynchronous transmission area (ASY) 38 for centralized management.

As a result of adopting such a frame structure, preferably, in the bandwidth reservation transmission area (RSV) 37, isochronous transmission defined by, for example, the IEEE 1394 format, can be performed, and in the asynchronous transmission area (ASY) 38, asynchronous transmission can be performed.

The operation of the wireless transmission apparatus constructed as described above will be described below.

Figure 4:
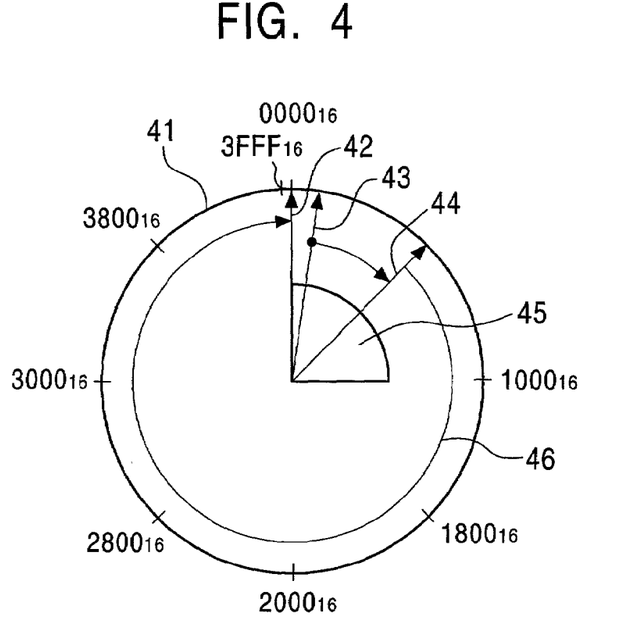
FIG. 4 shows an example of using a sequence number.

FIG. 4 shows an example of using a sequence number according to this embodiment. In FIG. 4, the outside circle represents a sequence-number space (0000 to 3FFF) 41, and in this space, a buffer pointer 44, a transmission pointer 43, an ACK receiving pointer 42, and a fan-shaped transmission window (0000 to 0FFF) 45 are provided as three pointers used for sequence control.

Here, a state in which the buffer pointer 44 can exist earlier than the transmission pointer 43 is shown, in which the ACK receiving pointer 42 is at "0000" and ACK has not been received.

Furthermore, a state in which the buffer pointer 44 makes it possible to buffer packets up to the ACK receiving pointer 42 minus one is shown.

Furthermore, the transmission pointer 43 shows that information transmission up to the buffer pointer 44 within a transmission window size 45 is possible.

Figure 5:
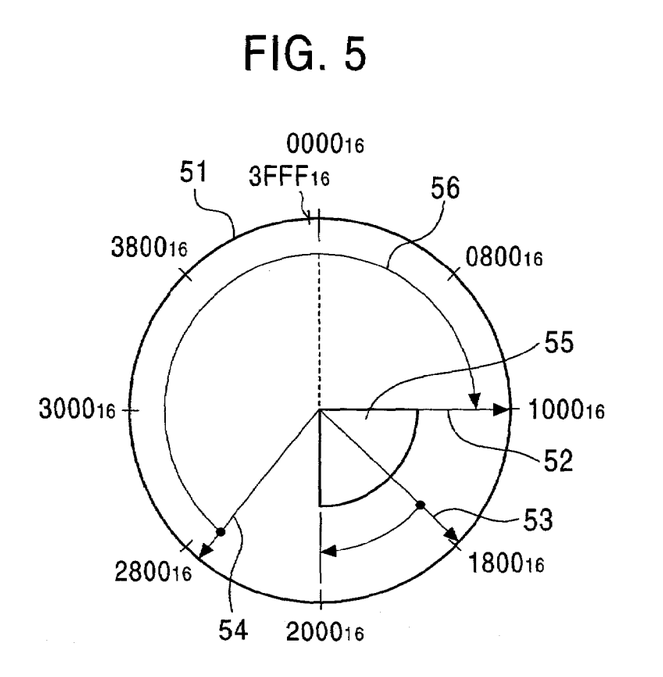
FIG. 5 shows an example of using a sequence number.

FIG. 5 shows an example of a state in which a method of using a sequence number according to this embodiment is used.

In FIG. 5, a situation in which, as an ACK receiving pointer 52 is moved to "1000", a fan-shaped transmission window size (1000 to 1FFF) 55 is shifted is shown.

Furthermore, when a buffer pointer 54 is outside the transmission window size 55, a situation in which only the packet up to the transmission window size (1FFF) 55 can be transmitted is shown.

However, since the buffer pointer 54 makes it possible to buffer packets up to the ACK receiving pointer 52 minus one, a transmission method in which asynchronous transmission information requested from the high-order layer need not be immediately discarded can be obtained.

Figure 6:
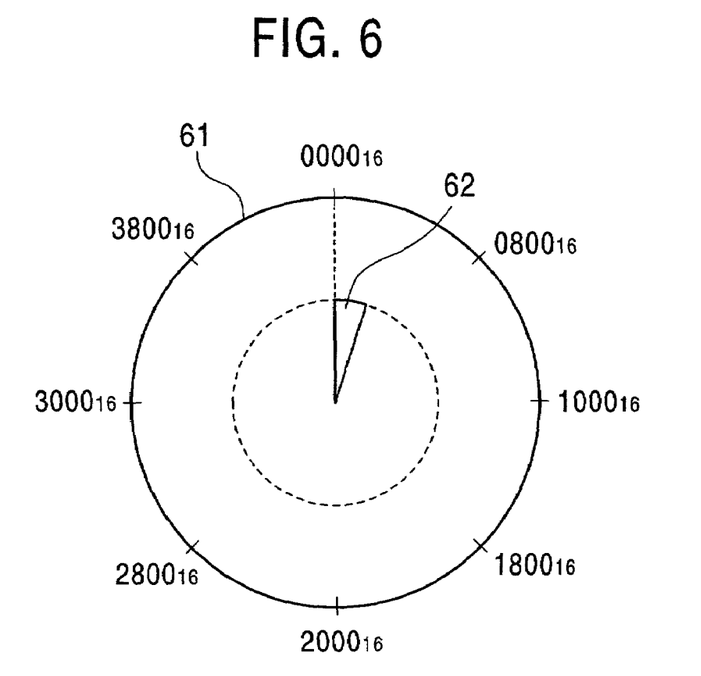
FIG. 6 shows the relationships between a sequence-number space and a window.
Figure 7:
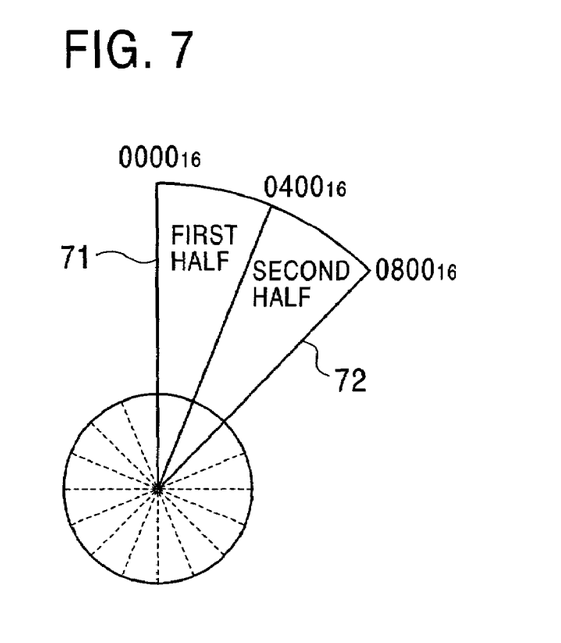
FIG. 7 shows a bit-map space which is two times as large as the window.
Figure 8:
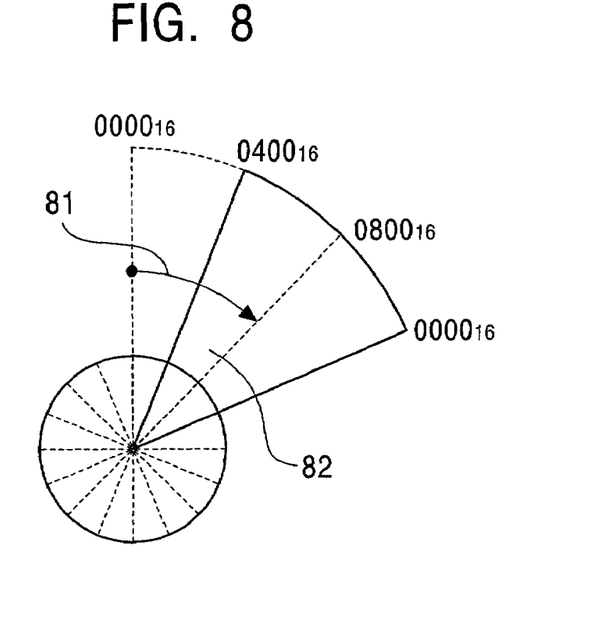
FIG. 8 shows an example of a shifting of a bit-map space.

FIGS. 6 to 8 show a method for managing sequence numbers inside the transmission apparatus according to this embodiment and a method for identifying a sequence-number space.

FIG. 6 shows the relationships between a sequence-number space and a window. FIG. 6 shows an example in which 16384 values from "0000" to "3FFF" are provided as a sequence-number space 61, and 1024 spaces from "0000" to "03FF" are specified as a transmission window size 62 among the values.

FIG. 7 shows a bit-map space which is two times as large as the window. FIG. 7 shows that, when a sequence-number space is used within the transmission apparatus according to this embodiment, a space which is two times as large as the transmission window size is provided as a low-order bit-map space 72 for the purpose of managing sequence numbers. Here, an example in which 2048 spaces from "0000" to "07FF" are provided as a bit-map space is shown.

Furthermore, an example in which a high-order-bit identification 71 is provided to indicate the position in the total sequence-number space the bit-map space represents is shown.

That is, 2048 bit-map spaces can be represented as 16 types of identifiers (4-bit information). Furthermore, the bit-map spaces are managed by being divided into 1024 spaces of the first half from "0000" to "03FF" and 1024 spaces of the second half from "0400" to "07FF".

FIG. 8 shows an example of a shifting of a bit-map space. FIG. 8 shows an example in which a packet is transmitted and when the ACK receiving pointer exceeds "03FF" which is the end position of the first half, an operation of shifting the bit-map space is performed.

This shows that, as a result of adding 1 to a high-order-bit identification 81 as indicated by reference numeral 81, the area indicated by the solid line becomes effective from the area indicated by the dotted line in the figure. That is, as a result of shifting the second half to the first half as indicated by reference numeral 82, the first half from "0400" to "07FF" and the second half from "0800" to "0BFF" are formed as a new bit-map space.

In this case, the earlier second half from "0400" to "07FF" is used continuously as a new first half, and the earlier first half from "0000" to "03FF" which is reset to zero is reused as a new second half, making it possible to reuse the bit-map spaces with only simple switching control without using a bit-shifting operation.

Figure 9:
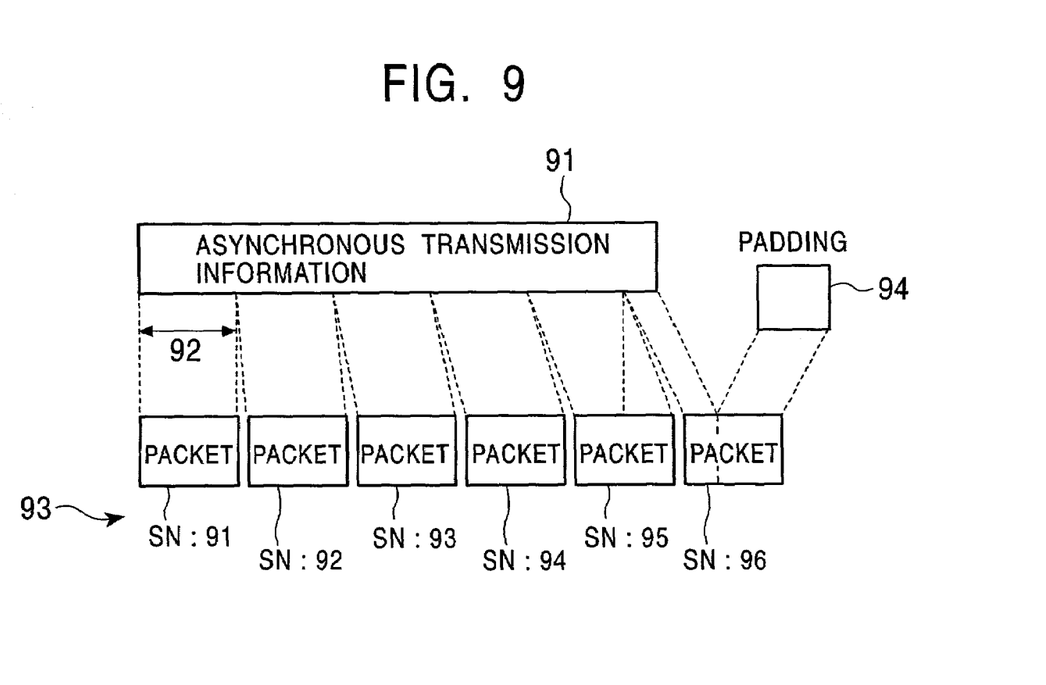
FIG. 9 shows a process of packetizing asynchronous transmission information.

FIG. 9 shows a process of packetizing asynchronous transmission information when a packet which is wirelessly transmitted is to be formed.

The upper portion in the figure is made to be asynchronous transmission information 91 transmitted to the interface section 25 from the connected device 29 shown in FIG. 2 through the high-speed serial bus 28. As shown in FIG. 9, in order to transmit the asynchronous transmission information 91, this information is divided into packets 93 from sequence numbers SN91 to SN96 at a predetermined fragment size 92 shown in the lower portion in the figure.

Here, in order for information which is less than one packet like the end packet of sequence number SN96 to be formed as one packet, null data 94 is added as padding.

Furthermore, sequence numbers SN91 to SN96 are set in sequence in the fragmented packets 93 according to the value of the buffer pointer, and the packet is buffered in the transmission buffer 23A shown in FIG. 2.

Figure 10:
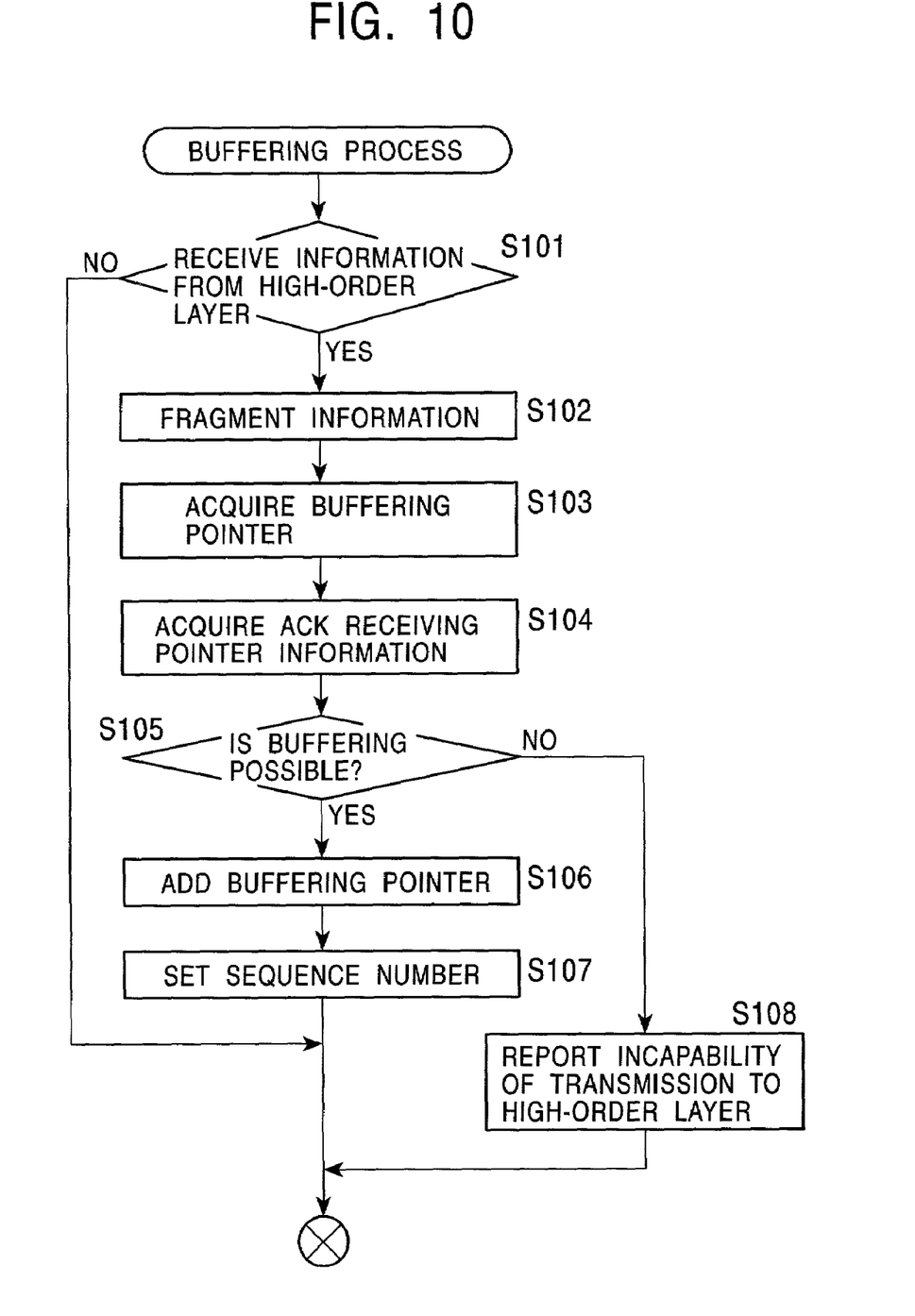
FIG. 10 is a flowchart of a buffering process.

FIG. 10 is a flowchart of a buffering process. FIG. 10 shows a buffering process in the information conversion processing section 24 shown in FIG. 2.

Initially, in step S101, it is determined whether or not an asynchronous transmission request is received from the interface section 25. When it is determined in step S101 that an asynchronous transmission request is received, in step S102, the information is divided into packets at a predetermined fragment size. When the information is less than a predetermined fragment size, it is handled as one packet.

In step S103, the value of the buffer pointer is obtained. Furthermore, in step S104, the ACK receiving pointer information is obtained. In step S105, the difference between these values is computed to determine whether or not buffering is possible.

When it is determined in step S105 that buffering is possible, in step S106, the buffer pointer is added. In step S107, the value of the buffer pointer is set as the sequence number of the corresponding packet, and the buffering process is terminated.

When it is determined in step S105 that buffering is not possible, in step S108, the fact that buffering is not possible is reported to the high-order layer via the interface section 25, and the process exits.

Figure 11:
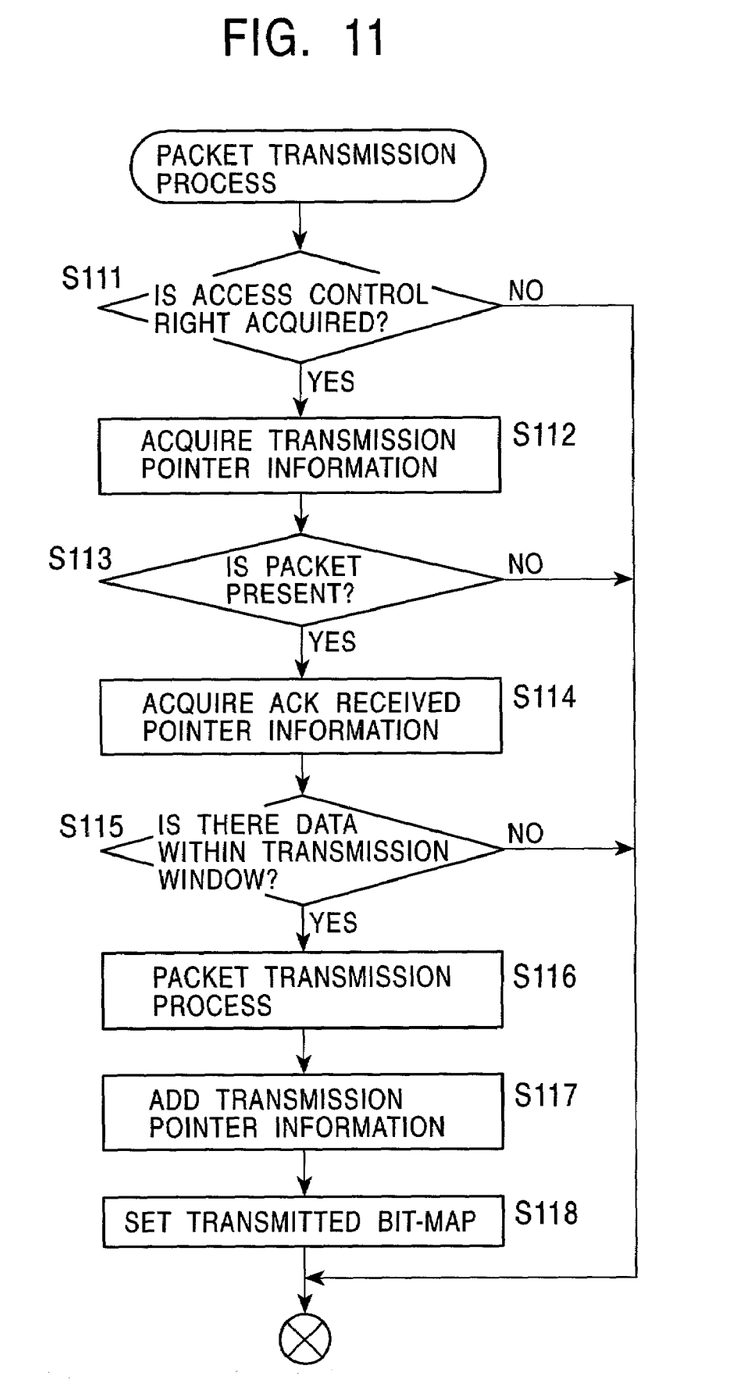
FIG. 11 is a flowchart of a packet transmission process.

FIG. 11 is a flowchart of a packet-transmission process. FIG. 11 shows a packet transmission process of the transmission buffer 23A connected to the wireless transmission processing section 22 shown in FIG. 2.

Initially, in step S111, it is determined whether or not an access control right on the wireless transmission line is acquired.

When it is determined in step S111 that the access control right is acquired, in step S112, the value of the transmission pointer is obtained, and in step S113, it is determined whether a packet is present or absent.

When it is determined in step S113 that the packet is present, in step S114, ACK receiving pointer information is obtained. Then, in step S115, it is determined whether or not there is data within the transmission window.

When it is determined in step S115 that there is data within the transmission window, in step S116, a packet transmission process is performed. In step S117, the transmission pointer is added, and in step S118, a transmitted bit map is set, and the transmission process is terminated.

When it is determined in step S113 that a packet is not present or when there is no data within the transmission window in step S115, the process exits.

Figure 12:
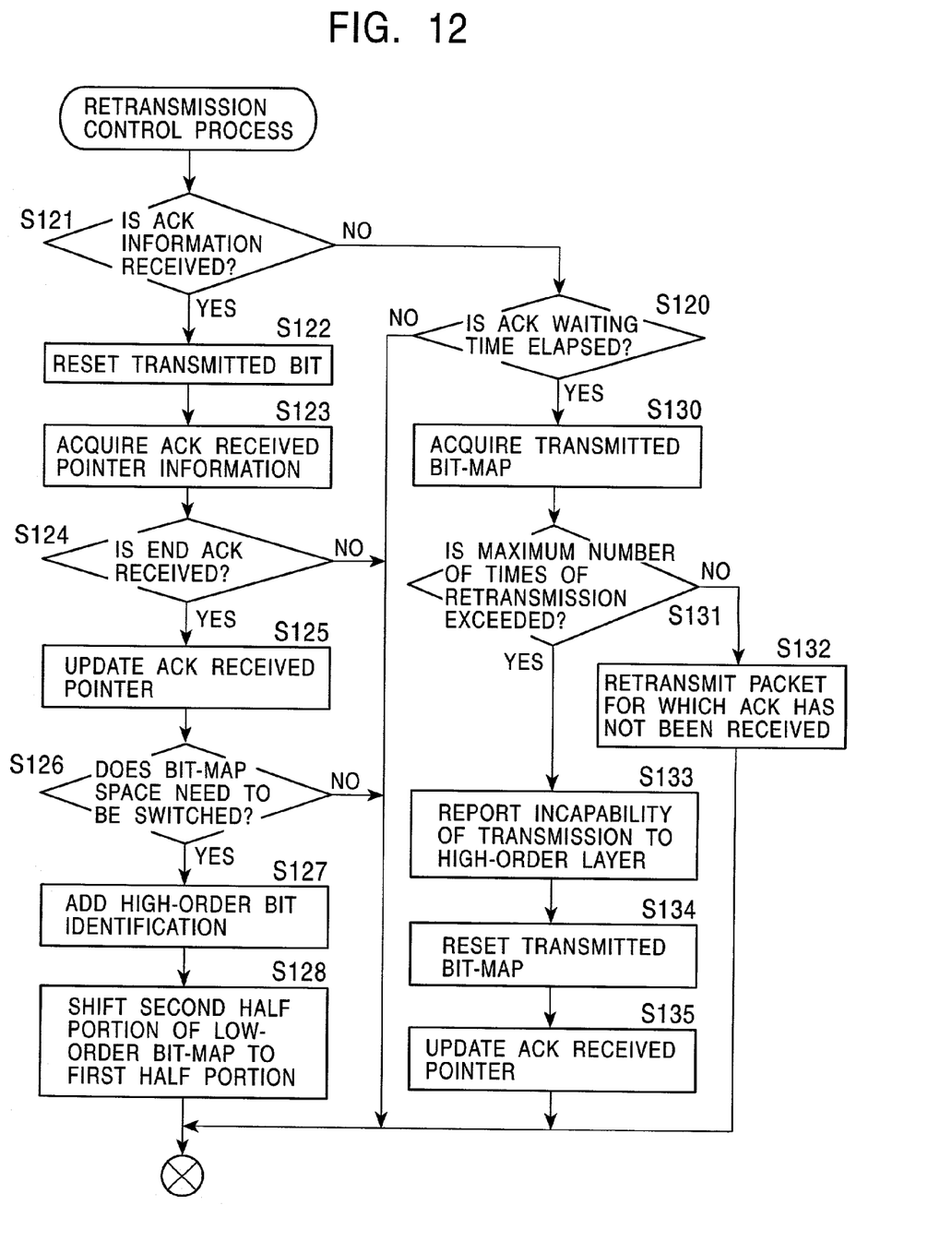
FIG. 12 is a flowchart of a packet retransmission control process.

FIG. 12 is a flowchart of a process during packet retransmission control. FIG. 12 shows the sequence of the retransmission control process in the information conversion processing section 24 connected to the receiving control processing section 23B shown in FIG. 2.

Initially, in step S121, it is determined whether or not ACK information is received. When it is determined in step S121 that the ACK information is received, in step S122, the transmission-complete bit of the transmitted bit map is reset.

Furthermore, in step S123, the ACK receiving pointer is obtained, and in step S124, it is determined whether or not the ACK information of the end packet is received. When it is determined in step S124 that the ACK information of the end packet is received, in step S125, the value of the ACK receiving pointer is updated. When it is determined in step S124 that the ACK information of the end packet is not received, the process exits.

Furthermore, in step S126, it is determined whether or not the bit-map spaces must be switched. When it is determined in step S126 that the bit-map spaces must be switched, in step S127, the high-order-bit identification is added. In step S128, the second half of the low-order bit map is set as a new first half, and the series of processes exits.

When it is determined in step S121 that the ACK information is not received, in step S129, it is determined whether or not a predetermined ACK waiting time has elapsed. When it is determined in step S129 that the predetermined ACK waiting time has elapsed after the packet is transmitted, in step S130, the transmitted bit-map information is obtained, and in step S131, it is determined whether or not a maximum number of times of retransmission is exceeded. When it is determined in step S131 that the maximum number of times of retransmission is not exceeded, in step S132, the packet for which ACK has not been received is retransmitted.

When it is determined in step S131 that the maximum number of times of retransmission is exceeded, in step S133, the fact that transmission was not possible is reported to the high-order layer, and in step S134, the transmission-complete of the transmitted bit map is reset. Then, in step S135, the ACK receiving pointer is updated.

In the above-described embodiments, examples in transmission flow control are described. However, the present invention is not limited to these examples, and may be applied to another transmission control.

What is claimed is:

1. A wireless transmission method for transmitting packets of asynchronous information to a wireless transmission apparatus of an information transmission destination from a wireless transmission apparatus of an information transmission source in a wireless network formed using a plurality of transmission apparatuses which are communication stations, said wireless transmission method comprising the steps of:

in said wireless transmission apparatus of the information transmission source, dividing asynchronous information to be transmitted from a high order layer into packets in sequence at a predetermined fragment size when the asynchronous information is received;

adding a sequence number to each of said packets and buffering the packets in a transmission buffer, the sequence numbers added to said packets beginning with a number stored in a buffer pointer;

writing to said buffer pointer a sequence number corresponding to the most recently added sequence number; and transmitting said packets to said wireless transmission apparatus of the information transmission destination under a predetermined access control.

2. A wireless transmission method for transmitting packets of asynchronous information to a wireless transmission apparatus of an information transmission destination from a wireless transmission apparatus of an information transmission source in a wireless network formed using a plurality of transmission apparatuses which are communication stations, said wireless transmission method comprising the steps of:

in said wireless transmission apparatus of the information transmission source, dividing asynchronous information to be transmitted from a high order layer into packets in sequence at a predetermined fragment size when the asynchronous information is received;

adding a sequence number to each of said packets and buffering the packets in a transmission buffer, the sequence numbers added to said packets beginning with a number stored in a buffer pointer;

writing to said buffer pointer a sequence number corresponding to the most recently added sequence number; and transmitting said packets to said wireless transmission apparatus of the information transmission destination under a predetermined access control;

wherein upon further transmission packets are stored in said buffer up to a value indicated by a total sequence-number space for the packet for which acknowledgement information is received from said wireless transmission apparatus of the information transmission destination minus one.

3. A wireless transmission method for transmitting packets of asynchronous information to a wireless transmission apparatus of an information transmission destination from a wireless transmission apparatus of an information transmission source in a wireless network formed using a plurality of transmission apparatuses which are communication stations, said wireless transmission method comprising the steps of:

in said wireless transmission apparatus of the information transmission source, providing a predetermined transmission window size; and transmitting a packet when said packet is within said transmission window size even when reception of acknowledgement information from said wireless transmission apparatus of the information transmission destination is not confirmed, said steps performing transmission control during transmission of the packets of asynchronous information;

wherein said transmission control during the transmission of packets of asynchronous information is used for selection-repeat-resend-type automatic resend request control in which a packet of asynchronous information which is received from said wireless transmission apparatus of the information transmission destination is transmitted as acknowledgement to said wireless transmission apparatus of the information transmission source, and only a packet which has not been received is selected and retransmitted from said wireless transmission apparatus of the information transmission source.

4. A wireless transmission method using selection-repeat-resend-type automatic resend request control in which a packet of asynchronous information which is received from said wireless transmission apparatus of the information transmission destination is transmitted as acknowledgement to said wireless transmission apparatus of the information transmission source, and only a packet which has not been received is selected and retransmitted from said wireless transmission apparatus of the information transmission source in a wireless network formed using a plurality of transmission apparatuses which are communication stations, said wireless transmission apparatus comprising:

in said wireless transmission apparatus of the information transmission source, providing a predetermined transmission window size;

using a low-order bit-map-space area which is two times as large as said transmission window size, and a high-order-bit identification pointer for indicating the position in the total sequence-number space to which said low-order bit-map-space area corresponds; and virtually performing transmission control in the total sequence-number space by repeatedly reusing said low-order bit-map-space area and said high-order-bit identification pointer, said steps performing transmission control during information transmission.

5. A wireless transmission apparatus for performing transmission of asynchronous information under the control of predetermined access control in a wireless network formed using a plurality of transmission apparatuses which are communication stations, said wireless transmission apparatus comprising:

packetizing means for dividing asynchronous information into packets in predetermined information units on said wireless network;

buffering means for buffering said packets in a transmission buffer;

sequence number assigning means for assigning a sequence number for each of said packets;

storage means for storing the most recent sequence number buffered in said buffering means as a buffer pointer; and sequence number adding means for reading the value of said buffer pointer and adding a sequence number when asynchronous information is next buffered.

6. A wireless transmission apparatus for transmitting information in a wireless network formed using a plurality of transmission apparatuses which are communication stations using selection-repeat-resend-type automatic resend request control in which information on a packet which is received by a wireless transmission apparatus of an information transmission destination is transmitted as acknowledgement to a wireless transmission apparatus of an information transmission source, and only a packet which has not been received is selected and retransmitted from said wireless transmission apparatus of the information transmission source, said wireless transmission apparatus comprising:

in said wireless transmission apparatus of the information transmission source, window size setting means for providing a predetermined transmission window size;

low-order bit-map-space area setting means for setting an area which is two times as large as said window size; and high-order-bit identification pointer setting means for indicating the position in the total sequence-number space to which said low-order bit-map-space area corresponds, wherein transmission control in the bit-map spaces of the total sequence-number space is virtually performed by repeatedly reusing said low-order bit-map-space area and said high-order-bit identification pointer.

7. The wireless transmission method as recited in claim 1, wherein said asynchronous information to be transmitted is received by said higher order layer via a high speed serial bus.

8. The wireless transmission method as recited in claim 1, wherein said higher order layer is a high speed serial bus interface.

\* \* \* \* \*

UNITED STATES PATENT AND TRADEMARK OFFICE
CERTIFICATE OF CORRECTION

PATENT NO. : 7,164,695 B2 Page 1 of 1
APPLICATION NO. : 10/085451
DATED : January 16, 2007
INVENTOR(S) : Shigeru Sugaya, Yasunori Maeshima and Hidemasa Yoshida It is certified that error appears in the above-identified patent and that said Letters Patent is hereby corrected as shown below:

Column 1, line 56, the initials "ARG" should read --ARQ--.
Column 6, line 12, the word "bitmap" should read --BIT-MAP--.

Signed and Sealed this

Fourth Day of December, 2007

JON W. DUDAS
*Director of the United States Patent and Trademark Office*